United States Patent [19]

Christy et al.

[11] Patent Number: 4,577,284
[45] Date of Patent: Mar. 18, 1986

[54] ADAPTIVE ROBOT BATCH ASSEMBLY SYSTEM

[75] Inventors: Arthur E. Christy; Elmer J. Gill, both of Austin, Tex.

[73] Assignee: International Business Machines Corporation, Armonk, N.Y.

[21] Appl. No.: 673,447

[22] Filed: Nov. 20, 1984

Related U.S. Application Data

[63] Continuation of Ser. No. 363,994, Mar. 31, 1982, abandoned.

[51] Int. Cl.⁴ .................... G06F 15/46; G06F 15/20
[52] U.S. Cl. .................................. 364/513; 364/468; 364/478; 414/730; 414/273; 29/568
[58] Field of Search ............... 364/468, 474, 478, 479, 364/513, 475; 414/730, 751, 589, 273; 29/563, 568, 33 P; 198/341

[56] References Cited

U.S. PATENT DOCUMENTS

| | | | |
|---|---|---|---|
| 3,951,273 | 4/1976 | deCaussin | 901/6 |
| 3,952,388 | 4/1976 | Hasegawa et al. | 29/563 |
| 4,037,731 | 7/1977 | Reis et al. | 414/730 |
| 4,053,741 | 10/1977 | Ainoya et al. | 364/478 |
| 4,092,719 | 5/1978 | Salmon | 364/478 |
| 4,173,817 | 11/1979 | Voglrieder et al. | 29/568 |
| 4,218,816 | 8/1980 | Dormell | 414/730 |
| 4,260,941 | 7/1981 | Engelberger et al. | 318/562 |
| 4,309,600 | 1/1982 | Perry et al. | 364/468 |
| 4,359,815 | 11/1982 | Toyoda | 29/568 |
| 4,369,563 | 1/1983 | Williamson | 29/563 |
| 4,372,538 | 2/1983 | Balfanz | 414/751 |
| 4,429,443 | 2/1984 | Kolbin et al. | 29/568 |
| 4,486,928 | 12/1984 | Tucker et al. | 29/568 |
| 4,495,588 | 1/1985 | Nio et al. | 364/513 |

OTHER PUBLICATIONS

"Flexible Manufacturing Systems", Hass, P.R., Numerical Control Society, Conference 4/74, pp. 288–301.

*Primary Examiner*—Jerry Smith
*Assistant Examiner*—John R. Lastova
*Attorney, Agent, or Firm*—Andrea P. Bryant

[57] ABSTRACT

A technique for accomplishing automated small batch assembly using a sophisticated computer program controlled robot (8) is disclosed wherein the robot work envelope (51) is divided into three independent work areas. Each work area is provided with a port (53, 55, 57) to which a self-contained, task oriented mobile workstation (130) may be attached. Manipulator (10) is controlled to perform the steps associated with the assembly tasks on the mobile workstations in priority sequence.

7 Claims, 5 Drawing Figures

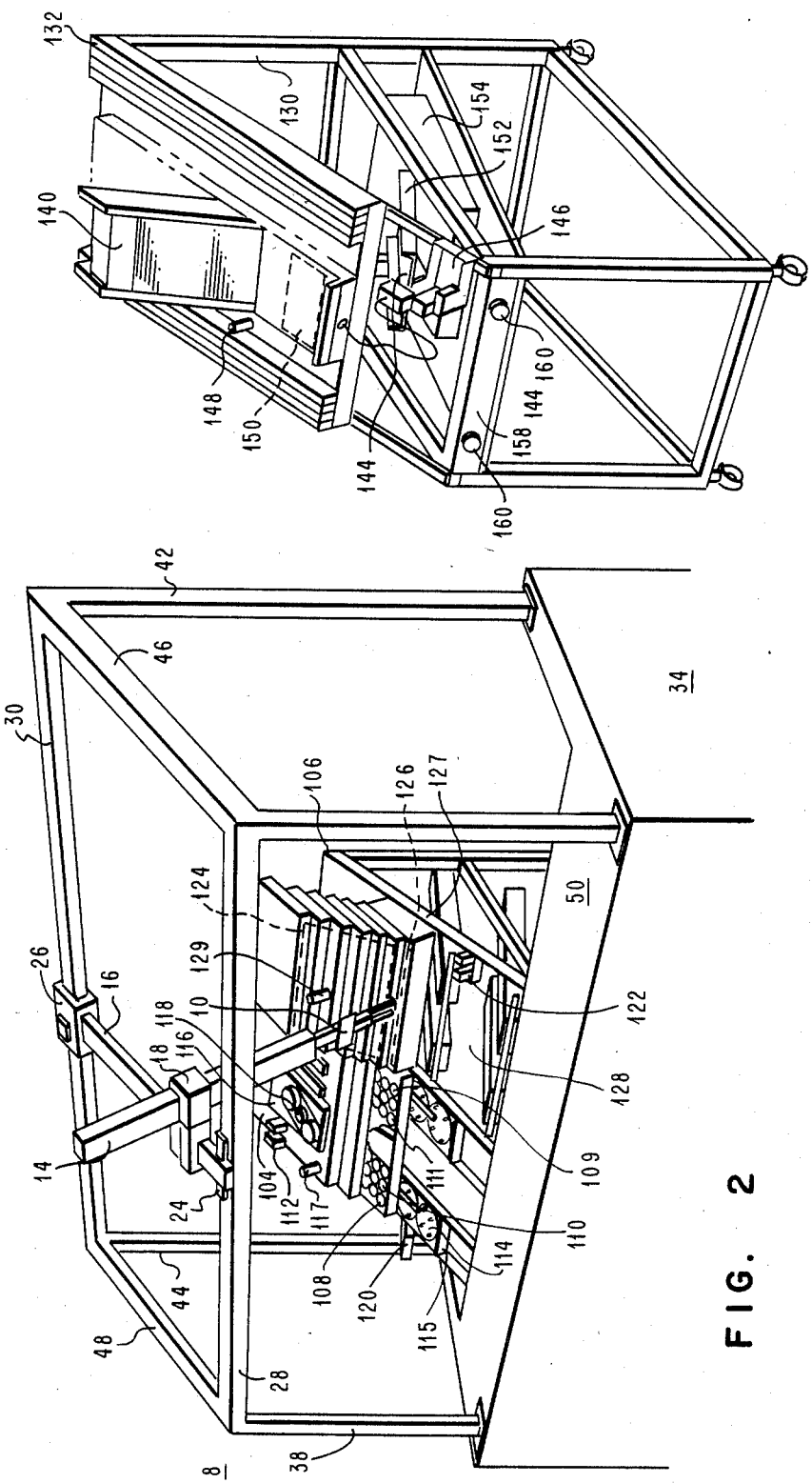

12,577,284

ADAPTIVE ROBOT BATCH ASSEMBLY SYSTEM

CROSS REFERENCE TO RELATED APPLICATION

This application is a continuation of U.S. application Ser. No. 363,994 filed Mar. 31, 1982 now abandoned. Now also abandoned is commonly assigned U.S. Application Ser. No. 336,995 entitled Progressive Line Assembly Using Adaptive Robot, having A. E. Christy et al. as inventors, filed concurrently herewith.

TECHNICAL FIELD

This invention relates to automated batch assembly techniques using a computer program controlled manipulator. More specifically this invention relates to automatic, robotic batch assembly or processing of low volume work with no operator dependent down time for job set-up, change-over, or error condition related activities.

BACKGROUND ART

Conventional robotics applications in industry are many and well known. Most are dedicated to a single specific type highly repetitive work such as spot welding, spray painting, loading and unloading. Other uses for robots are light processing tasks such as, for example, deburring, drilling, or tapping. Each of these robotics applications may be operated in accordance with computer programmed patterns. In assembly or processing work robots are used as a dedicated part of an inflexible system operating on high volumes of identical or family related subassemblies. To utilize a given robot for more than one application is, generally speaking, an uneconomical operation because a great deal of manpower and machine downtime are associated with application change-over or set-up.

Surveys have determined that more than two thirds of all human effort expended in manufacturing is expended in dealing with batches of work comprising fifty pieces or fewer. Those skilled in the art of robotics do not generally expect a robot to operate at a throughput rate significantly higher than 150% of the human rate for the same assembly work. For low volume, small lot assembly or processing, the time, effort and cost spent in setting up and changing over the tools, parts and so forth from one assembly task to the next could easily exceed the higher throughput and other benefits of automating that task. Further, human operator controlled set-up/change-over time represents lost productivity and lost utilization of capital assets. Also to be considered is the hazard to the operator associated with performing that set-up/change-over within the work envelope of the robot.

DISCLOSURE OF THE INVENTION

The present invention comprises a method and apparatus related to efficient operation of a programmed robot for small lot assembly or processing work. The apparatus of the present invention includes a highly sophisticated robot, comprising a manipulator capable of movement within a plurality of degrees of freedom and having means to provide feedback relating to its position and condition, in combination with self-contained task carts. Each task cart contains the necessary tools and/or parts to enable the robot to perform that task. The manipulator is suitably programmed to grasp a tool and perform the desired sequence of actions on the parts which may be provided on the cart. When one task is satisfactorily, or unsatisfactorily, completed the manipulator moves on to another task cart. In this manner downtime is significantly decreased since carts may be fitted off-line and brought to the robot work envelope.

In some applications it may be necessary to distribute the tooling and parts supplies over more than one cart. Conversely, a plurality of unrelated tasks may be tooled on one cart. Great flexibility is possible when using the present invention.

Other features and advantages of the invention will become apparent from the following more particular description of a preferred embodiment as illustrated in the accompanying drawing.

BRIEF DESCRIPTION OF THE DRAWING

FIG. 2 is a perspective view of the work envelope of the robot of FIG. 1 with two task carts in operative position.

FIG. 3 shows a cart set up for a third task.

BEST MODE FOR CARRYING OUT THE INVENTION

The robot and computer apparatus described has been chosen for illustrative purposes only, and other types of robots and associated devices may be used without departing from the scope of the present invention.

Figure 1:
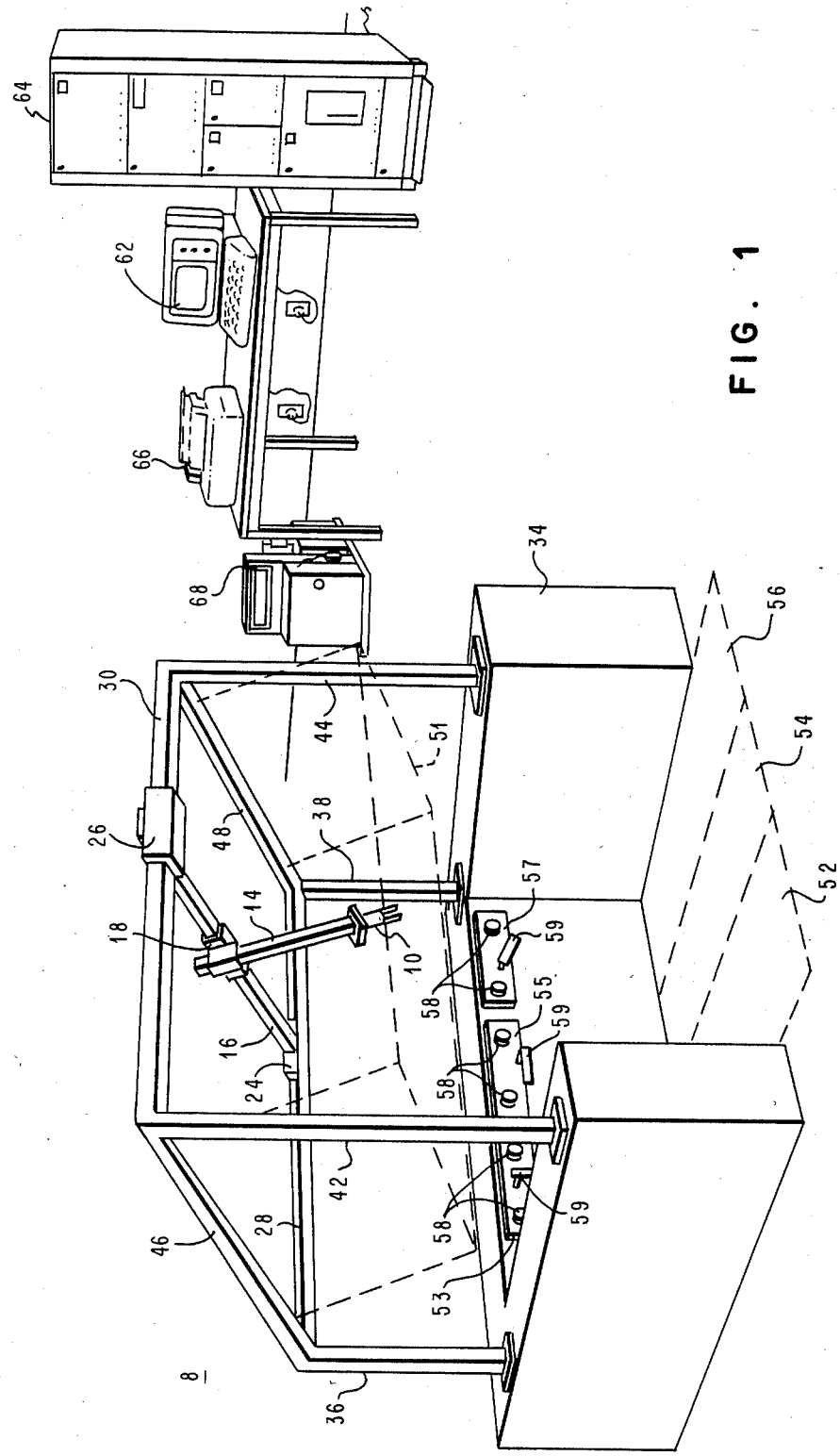
FIG. 1 shows an illustrative hardware configuration for implementing the present invention.

Refer now to FIG. 1 for an understanding of an exemplary system for operating a robot generally indicated at 8. Automated manipulator 10 is mounted to the end of arm 14. Arm 14 is mutually perpendicular to and moveable along arm 16 by means of motorized trolley 18. Arm 16 is connected at one end in idler support trolley 24. The other end of arm 16 is connected to motorized trolleys 26. Trolleys 24 and 26 are moveable along parallel tracks 28 and 30, respectively. The hoses and wires for supply hydraulic and electric power to the trolleys are not shown.

Track 28 is mounted to base 34 by posts 36 and 38. Track 30 is connected to base 34 by posts 42 and 44. Posts 42 and 44 are longer than posts 36 and 38 so that arm 14 and thus manipulator 10, is positioned at an angular displacement from vertical. For the illustrated configuration, a displacement of about 30 degrees has been found advantageous. The upper frame comprising tracks 28 and 30 and rails 46 and 48 is displaced about 30 degrees from the horizontal for supporting manipulator 10 at the desired position. The work envelope of robot 8 includes the space enclosed by tracks 28 and 30, rails 46 and 48, and dashed lines 51.

The work envelope of robot 8 is subdivided into three independent work areas. The dotted areas 52, 54 and 56 represent the positions c the self-contained task carts or mobile workstations, which may be brought to the work envelope when work is to be performed by robot 8. Three corresponding ports 53, 55 and 57 are located on the interior of base 34. Each port 53, 55 and 57 includes alignment posts 58 for mating with the alignment holes located on any cart. A rotatable air clamp type latch 59 is provided at each port to lock a mobile workstation in place. Latches 59 at ports 53, 55, 57 are shown in different relative positions to illustrate the rotatability.

Manipulator 10 is positioned by hydraulically powered moving arm 14 and is operated under computer control. A suitable manipulator is that disclosed in commonly assigned U.S. Pat. No. 4,132,318. An illustrative control system is also shown in FIG. 1 and includes a keyboard display input output (on tube) unit 60 for input, a processor/storage unit 62, printer 66 for hard copy output, and hydraulic power source 68.

The details of the above-mentioned system components are not part of the present invention. Their operation and interaction with the manipulator itself, as well as the routing of hoses and cables, are described in the IBM Robot System/1 General Information Manual and Users' Guide GA34-0180-1 and related Technical Newsletter updates.

FIG. 2 is a perspective view of robot 8 as seen from the front with two task carts 104 and 106 placed in positions 56 and 54 from FIG. 1, respectively. Cart 104 is set up for an assembly task involving the placement of gears 108 and 109, from gravity fed trays 110 and 111. Tool 112 is specially designed to place gears 108 and 109 onto a gear plate 114. To perform this task tool 112 takes a plate 114 from gravity fed sources 115 and places it on fixture 116. A completed subassembly 118 of plate and gears is then dropped in chute 120. Chute 120 leads to a container (not shown) which may be emptied at will by the human operator. Located adjacent to fixture 116 is find post 117. Find post 117 is used by the robot to accurately relate the position of task cart 104 to the manipulator 10.

Cart 106 is set up for another task which may be totally unrelated to that on cart 104. Cart 106 is provided with a tool 122 to pick parts from area 124 and place them on a subassembly in area 126 and after completion to drop the subassembly into chute(s) 128. Find post 129 is used in similar manner to find post 117 above to accurately relate the position of the task cart, in this case 106 to the manipulator 10.

Each cart generally has these common characteristics; a supply of parts to be assembled into a given subassembly, a work area in which to perform the assembly, a find post for use in calibrating the relative positions of the cart and manipulator within the robot work envelope, a receiving area for completed subassemblies, and a tool or tools for performing the task involved. Each tool is uniform in that it may be gripped by manipulator 10. That is, each tool conforms to the gripper portion of manipulator 10 for movement therewith. Each cart further has alignment and locking means (FIG. 3) to enable it to be used at any cart position 52, 54 and 56 (FIG. 1).

The primary work surface of each cart, as illustrated by the side portion 127 of cart 106 (FIG. 2) is tilted upward 30 degrees from the upper surface 50 of the base 34 on which the entire robot 8 stands. This configuration of the mobile cart and its positional relationship to the manipulator result in another advantage of the present invention. Complex, mechanical parts feeder devices are not required. Gravity feed is sufficient. Another advantage proceeding from having the tilted surface is that manipulator 10 must make fewer moves in its various directions to reach a given position, thereby decreasing potential error possibilities.

Other advantages accrue from such an arrangement as shown in FIG. 2. Dividing the work envelope of robot 8 into a plurality of sections decreases the frequency and duration of operator attendance time by allowing the manipulator to automatically go from one task to another until all work that can be accomplished is completed on all task carts. Further, the smaller sections result in improved cycle times and reduced wear on manipulator mechanisms.

FIG. 3 shows a mobile, self-contained task cart 130 fitted to drive screws from feed tubes 132 into a bracket taken from stack 140. A tool 144 for these tasks is contained in special holder 146. Find post 148 is provided for manipulator calibration purposes.

In this particular instance, tool 144 is adapted to perform more than one task. That is, it can pick up a bracket from stack 140 and place it at work area 150. When work on a bracket is completed, the bracket is placed into chute 152 which leads to bin 154 where they accumulate until removal by the operator.

It is to be noted that the configuration of tooling on cart 130 is illustrative. The optimum placement of fixtures differs from one application to another and, to a certain degree, is a matter of choice. Often it is desirable to provide a plurality of supply sources for a single input part in order to increase the interval between cart resupply as well as to increase the probability of recovery of errors due to misfeeds.

The alignment holes 160 are provided in front rail 158 to receive the alignment posts 58 in robot base 34 (FIG. 4) to properly position cart 130 within the work envelope of the robot. Latch 59 in robot base 34 (FIG. 1) cooperates with front rail 158 of the cart. The rotatable latch 59 moves behind rail 158 to pull and lock the cart into its final position.

The surface 50 of robot base 34 is horizontal and is high enough from the floor to conform to the front edge of a task cart. As shown in FIG. 3, this would be the front rail 158. This height is chosen to be comfortable for a seated operator. Such a configuration is desirable to enable maximum use of the carts. The carts are not restricted to use with a robot but may also be utilized as a traditional, non-automated, but mobile work station for small jobs or rush jobs or the like.

Individual task carts, which may also be referred to as adaptive subassembly carts, are designed and tooled to support a particular assembly application. One advantage of this technique is the ease with which new applications may be developed. Given the basic cart design the engineer may build and test and modify through many iterations before committing significant manpower/machine resources. It may also be that a particular application would require two or more identically designed and tooled carts to accommodate a larger number of individual subassemblies to be manufactured.

The adaptive assembly system of the present invention can accommodate such changes because once the instructions for a given task cart assembly application are developed and debugged, that program may be stored and called as needed to cause the robot to operate a given task.

Figures 4, 5:
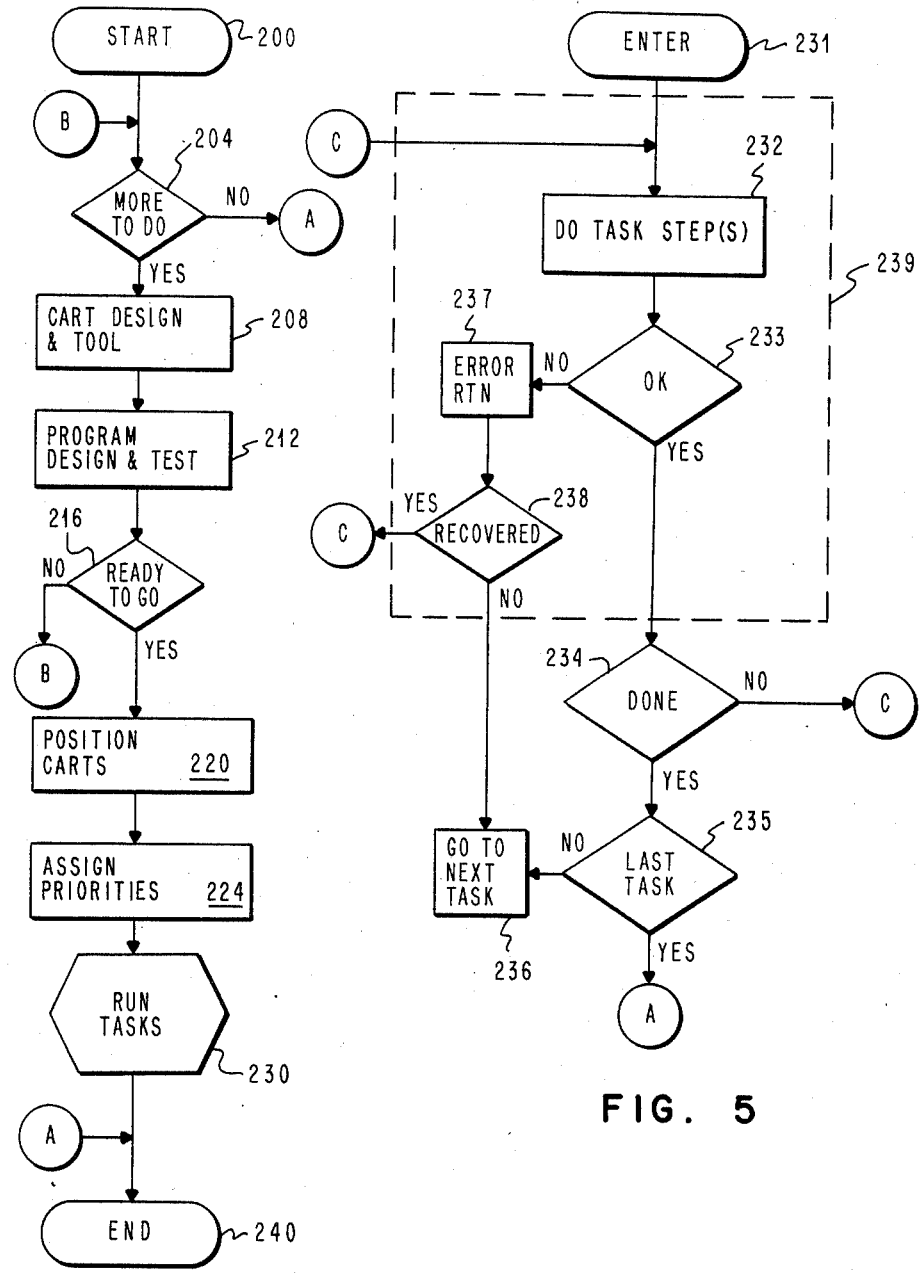
FIG. 4 is a flow chart of the operation of the system of the present invention.
FIG. 5 is a more detailed flow chart of one process block in FIG. 4.

Refer now to FIG. 4, which is a flow chart of the overall process of adaptive batch assembly using the present invention. In determining the optimum use of expensive equipment and manpower, care and time is taken for the cart and software design stages. Thus, at entry point 200 the first determination made is whether there is more work to do in setting up a particular manufacturing run at decision block 204. If the answer is yes, then cart design and tooling occurs. The length of time devoted to this aspect of the project of course varies with the complexity of the task to which the cart will be dedicated and is in fact an iterative process.

As process block 208 represents a hardware design and test, so does block 212 represent software design and test. That is the software necessary to command the manipulator to perform the task tooled on the cart. It, too, is an iterative process since not only direct assembly movements but appropriate error routines must be developed. The details of this phase of design do not comprise a part of the present invention. A particular language associated with a particular manipulator is A Machine Language (AML) which is the program support provided for and with the IBM Robot System I.

The determination is made at decision block 216 whether the robot is ready to go. In other words all carts and programming ready for a test or production run. If not, we go back to decision block 204. If, however, carts are ready; they are positioned in their respective locations (FIG. 1), which is indicated at block 220.

Priorities are assigned as part of the software aspects of the control system and task at block 224. One great advantage of the present adaptive batch assembly technique resides in optimizing robot usage and minimizing the need for human operator intervention. One aspect of achieving this advantage relates to prioritizing robot attention to a given task oriented cart. Stated simply robot control includes the ability to attend to the carts at positions 52, 54 and 56 in any order. Alternatively, each of those positions could be assigned a particular priority and carts located accordingly.

The tasks are allowed to run as shown at 230 and the operator is free to attend to other duties. When the tasks have all been run, the end of the process is reached at terminal 240.

Inherent in the process block 230 in FIG. 4 is the set of decisions and actions shown in FIG. 5. Each task, that is, each set of actions and decisions associated with a cart includes the following: The robot performs the previously programmed steps of the task as indicated on block 232. As each step or series of steps is completed, a determination of successful completion is made at decision block 233. If yes, a given program then determines whether it is finished performing that series of steps. If it is not finished control returns to task step performance block 232. Inherent in this determination of whether a performance of a given task is complete is a check on the status of part(s) supplies. If any part is depleted then by definition no more work can be done on that task.

Next, a determination is made at decision block 235 whether that is the last task; that is, the last cart. If it is, return is made to the basic process shown in FIG. 4.

When the last task has not been completed, the system of the present invention immediately and automatically switches to the next task, which is on the next lower priority cart positioned within the robot work envelope. The next task follows the same general outline just discussed.

Returning now to decision block 233, if a particular manipulator movement is unsuccessful and/or results in an error condition, an error routine represented in block 237 is entered. Any error routine, regardless of the actual conditions involved, at a minimum determines whether a successful recovery is possible and attempts to do so. The robot continues its pre-programmed steps if at decision block 238 it is determined that recovery from the situation which caused the error has been accomplished. The loop of steps enclosed in dashed lines 239 is repeated; since in performing a particular task step at block 232 any number of error conditions could occur. Some examples are misfed parts, part-to-part variations and deviations from part specifications. These conditions are oftentimes detected by sensors in the gripper or manipulator 10 or by the particular tool held in the gripper portion of manipulator 10.

If, however, the error condition is such that no amount of retries can successfully recover, there is again an automatic default to the next lower priority task cart. Part of this default may of course as is well understood in the art, includes some sort of audible or visible signal to the operator that his attention is required. Note, however, the robot is not idled. Here is an illustration of the adaptive nature of the batch assembly technique of the in- vention.

While the invention has been shown and described with respect to a particular hardware and software environment, the basic concepts may be applied in other situations. For example, the robot may be a less sophisticated, different robot such as an anthropomorphic or pedestal type with floor, ceiling or wall mounting. Additionally, one having a work envelope described in polar coordinates as opposed to the Cartesian coordinates of IBM Robot System I may be used. A greater or lesser number of degrees of freedom may be used and the manipulator may be tilted or not at any suitable displacement.

Carts may be designed to suit particular contours of the chosen robot's work envelope. For example, a pedestal type anthropomorphic robot may be positioned in the center so that carts may be latched at suitable radial locations about the pedestal base. Obviously, the work surface may be flat or angled. Thus it will be understood by those skilled in the art that the foregoing and other changes in form and detail may be made without departing from the spirit and scope of our invention.

We claim:

1. An adaptive assembly system comprising:
   a computer controlled robotic manipulator for performing a plurality of assembly task sequences; and
   a plurality of task oriented workstations, each workstation containing all parts and tooling for supporting and supplying a given assembly task, each task oriented workstation being selectively positionable in locking engagement with framework supporting the manipulator
   whereby the manipulator may advance from one workstation to another with no down time associated therewith.

2. A method of improving automated assembly operation throughout by reducing down time associated with assembly task changeover comprising the steps of:
   providing a computer controlled robotic manipulator with a plurality of program sequences, each program sequence associated with a particular assembly task;
   designing self-contained workstations each including all of the parts and manipulator graspable tools for performing a particular assembly task; and
   placing a plurality of said individual self-contained task oriented workstations adjacent the computer controlled manipulator; and initiating robot operation for progressing from one of said workstations to another to execute the associated programming sequences.

3. Apparatus for enabling a computer controlled robot adapter for performing a variety of independent assembly tasks to sequentially perform these tasks in an improved manner comprising:

a plurality of indpendently constructed workstation carts, each workstation cart having thereon means for supplying parts, assembled subassemblies, and tools and fixtures used by the robot for performing a complete assembly task sequence;

means for attaching a plurality of said workstation carts to the robot; and means for providing sequences of programming instructions to the robot for progressing from a first workstation cart to another when no further assembly tasks can be performed at the first workstation cart.

4. A flexible manufacturing system comprising:

a programmable manipulator supported in a frame and adapted for grasping a plurality of tools;

a plurality of movable workstations adapted for mechanical connection to the frame supporting the manipulator, each workstation being supplied with parts and tools graspable by the manipulator for performing assembly tasks; and program means for directing the manipulator to sequentially perform the tasks associated with each workstation.

5. The system of claim 4 wherein each workstation contains parts and tooling for a plurality of individual tasks.

6. The system of claim 4 wherein a workstation includes only the parts and tooling for some of the steps of an assembly task sequence.

7. An improved adaptive assembly system comprising:

robot means for performing a variety of tasks under computer program control;

a plurality of carts selectively attachable to the robot, each cart providing a self-contained workstation having all parts, fixtures and tools necessary for a given assembly task; and program means for causing the robot to change its location from a first cart to another cart when unable to perform further tasks at the first cart.

* * * * *